(12) United States Patent
Bitzer et al.

(10) Patent No.: US 10,461,598 B2
(45) Date of Patent: Oct. 29, 2019

(54) DIRECT CURRENT MACHINE AND METHOD FOR MANUFACTURING A DIRECT CURRENT MACHINE

(71) Applicants: Paul-Gerhard Bitzer, Albstadt (DE); Harald Kauffmann, Albstadt (DE)

(72) Inventors: Paul-Gerhard Bitzer, Albstadt (DE); Harald Kauffmann, Albstadt (DE)

(73) Assignee: Alber GmbH (DE)

( * ) Notice: Subject to any disclaimer, the term of this patent is extended or adjusted under 35 U.S.C. 154(b) by 600 days.

(21) Appl. No.: 15/226,562

(22) Filed: Aug. 2, 2016

(65) Prior Publication Data
US 2017/0040857 A1 Feb. 9, 2017

Related U.S. Application Data

(63) Continuation-in-part of application No. 15/188,002, filed on Jun. 21, 2016, now Pat. No. 10,199,896.

(30) Foreign Application Priority Data

Aug. 4, 2015 (DE) .................. 10 2015 112 768

(51) Int. Cl.
*H02K 11/00* (2016.01)
*H02K 3/28* (2006.01)
(Continued)

(52) U.S. Cl.
CPC ............... *H02K 3/28* (2013.01); *H02K 1/148* (2013.01); *H02K 3/18* (2013.01); *H02K 15/0056* (2013.01);
(Continued)

(58) Field of Classification Search
CPC .. H02K 3/18; H02K 3/12; H02K 3/28; H02K 1/2786; H02K 1/2753
(Continued)

(56) References Cited

U.S. PATENT DOCUMENTS 5,164,622 A * 11/1992 Kordik ............... H02K 3/28
310/156.26
5,442,250 A * 8/1995 Stridsberg ............ B60K 7/0007
310/186

(Continued)

FOREIGN PATENT DOCUMENTS

DE 3434965 A1 9/1984
DE 199 83 946 T1 10/2001
(Continued)

*Primary Examiner* — Hanh N Nguyen
(74) *Attorney, Agent, or Firm* — Steven A. Nielsen; www.NielsenPatents.com

(57) ABSTRACT

A direct current machine comprises a stator and a rotor, wherein one of these two has a plurality of magnets which are alternatively magnetized north and south, and the respective other part has a plurality of coils which are formed by teeth around which insulated wire is wound, wherein between these coils there are formed respective slots and the coils are combined in coil groups; and a current controlled inverter for driving the machine; wherein each coil group has a front terminal and a rear terminal and the coil groups are connected such that a defined wiring concept is formed and wherein the front terminals and end terminals are connected via an interconnection element which is specifically designed for a defined wiring concept.

6 Claims, 19 Drawing Sheets

(51) Int. Cl.
*H02K 3/18*       (2006.01)
*H02K 15/095*     (2006.01)
*H02K 15/00*      (2006.01)
*H02K 29/00*      (2006.01)
*H02K 1/14*       (2006.01)
*H02K 21/22*      (2006.01)

(52) U.S. Cl.
CPC .......... *H02K 15/095* (2013.01); *H02K 29/00* (2013.01); *H02K 21/22* (2013.01); *H02K 2213/12* (2013.01)

(58) Field of Classification Search
USPC .......................................................... 310/71
See application file for complete search history.

(56) References Cited

U.S. PATENT DOCUMENTS

| | | | |
|---|---|---|---|
| 7,936,099 | B2 | 5/2011 | Staudemann et al. |
| 2008/0231133 | A1 | 9/2008 | Staudemann et al. |
| 2009/0309452 | A1 | 12/2009 | Tao et al. |
| 2013/0119809 | A1* | 5/2013 | Levesque ................. H02K 3/28 310/156.43 |
| 2014/0091656 | A1 | 4/2014 | Miyashita et al. |
| 2015/0303780 | A1* | 10/2015 | Kim ....................... H02K 21/12 310/68 B |

FOREIGN PATENT DOCUMENTS

| | | |
|---|---|---|
| DE | 1 675 249 A2 | 6/2006 |
| DE | 21 2006 000 034 U1 | 1/2008 |
| DE | 199 83 946 B4 | 4/2010 |
| DE | 10 2013 111 868 A1 | 4/2015 |
| EP | 1 499 003 A1 | 1/2005 |
| EP | 1913675 A1 | 4/2008 |
| EP | 2 154 768 A2 | 2/2009 |
| WO | WO 2000/60724 A1 | 10/2000 |
| WO | WO 2007/012207 A1 | 2/2007 |
| WO | WO 2009/070089 A1 | 6/2009 |

* cited by examiner

Scheme type 1: 4 coil groups parallel, star connection

Scheme type 2: 4 coil groups parallel, delta connection

Scheme type 3: 4 coil groups serial, star connection

Scheme type 4: 4 coil groups serial, delta connection

Scheme type 5: 2 coil groups serial, 2 coil groups parallel, star connection

Scheme type 6: 2 coil groups serial, 2 coil groups parallel, delta connection

DIRECT CURRENT MACHINE AND METHOD FOR MANUFACTURING A DIRECT CURRENT MACHINE

RELATED PATENT APPLICATION AND INCORPORATION BY REFERENCE

This is a utility application based upon and claims the benefit of and priority date of is a continuation in part of German patent application DE 10 2015 112 768.7 filed on Aug. 4, 2015. This utility patent application claims the benefit of and is a continuation in part of U.S. application Ser. No. 15/188,002 filed on Jun. 21, 2016 with is a continuation in part of and claims priority from German patent application 10 2015 110 127.0 filed on Jun. 24, 2015. These related applications are incorporated herein by reference and made a part of this application. If any conflict arises between the disclosure of the invention in this utility application and that in the related applications, the disclosure in this utility application shall govern. Moreover, the inventor(s) and or the applicant incorporate herein by reference any and all patents, patent applications, and other documents hard copy or electronic, cited or referred to in this application.

BACKGROUND OF THE INVENTION (1) Field of the Invention

The present invention relates to a direct current machine, specifically to an electrically or permanent excited brushless direct current machine, and a method for manufacturing a direct current machine. Such a machine can be used as a motor, for instance for driving a bicycle, and also as a generator for energy recuperation and charging of a battery.

(2) Description of the Related Art

The known related art includes a machine disclosed in DE 199 83 946 B4. Such a machine which can be operated as a motor or a generator has two components which are orientated with respect to each other in a concentric manner, usually called rotor and stator. One of these components, namely either the rotor or the stator, has a specific number of magnets, for instance permanent magnets, which are alternatively magnetized north and south, and the respective other part has a specific number of coils which are formed by teeth around which insulated wire is wound. Between these coils there are formed respective slots. Accordingly, these slots are the gaps between adjacent teeth.

The concept whether the rotor is disposed within or outside the stator and which of both components is provided with the permanent magnets, while then the other component has the coils and slots, is particularly determined or suggested by the respective use or application of the machine. Document DE 199 83 946 B4 discloses a permanent magnet brushless direct current machine which is used as a drive for a bicycle in a wheel in the form of a hub motor, wherein the central part is disposed in a stationary manner and therefore is the stator and has the coils and the slots, respectively, and where the rotor is an outer rotor provided with permanent magnets. Fed by a rechargeable battery as a power source, the motor can be used as a drive as well as a generator for energy recuperation and charging of the battery. The drive of the machine is effected in a normal manner via a current controlled inverter having three phases.

The number of poles, i.e. magnetic poles, and the number of slots, i.e. coils, are significant features in the design of such a machine. Document DE 1 99 83 946 B4 discloses for instance a kind of machine having twenty-two poles and twenty-four slots and a further machine variant having forty-four poles and forty-eight slots.

In addition to the numbers of poles and slots, the so called pole-slot-combination, there are further features of such a machine which are decisive for its characteristics. These include the kind of winding and the manner, in which the winding of the coils is connected, i.e. the so called coil groups wiring concept. The coils can be combined in groups and the wiring can be in the form of a star connection or in the form of a delta connection.

If the winding is to be produced by a semi-automatic or all-automatic wiring machine which wiring machine is specifically designed for this purpose, such machine requires a high volume of investment. In any event, such wiring machine has to be specifically set up and programmed for each kind of winding. This requires additional investments and nonproductive time due to changing the machine set up and programming the machine.

The kind of winding and the connection of the windings, i.e. the wiring concept as well as the assembly in groups, have to be taken into account already upon design of a machine. Respective contact points, i.e. terminals, have to be planned and must be provided.

In many aspects, the present invention provides a direct current machine which, specifically in view of what is discussed above, offers a high degree of variability, as well as a corresponding method of manufacturing.

BRIEF SUMMARY OF THE INVENTION

A direct current machine according the disclosed embodiments may comprise a stator and a rotor, wherein one of these two has a plurality of magnets which are alternatively magnetized north and south, and the respective other part has a plurality of coils which are formed by teeth around which insulated wire is wound, wherein between these coils there are formed respective slots and the coils are combined in coil groups, and a current controlled inverter for driving the machine, wherein each coil group has a front terminal and a rear terminal and the coil groups are connected to realize a specific or defined wiring concept and wherein the front terminals and end terminals are connected via an interconnection element which is specifically designed for the defined wiring concept.

The wiring concept of the coils or coil groups, enables a specific type of motor. For example, a so-called star connection type motor or a delta connection type motor, each with more or less coils or coil groups, respectively, connected in parallel and/or in a serial manner, respectively, are disclosed. The respective wiring concept and, accordingly, the corresponding type of motor, which different types of motors have different characteristics, are determined by the manner of how and in which sequence the front terminals and end terminals are connected and interconnected with each other.

An interconnection element in the meaning of the presently disclosed embodiments is a separate and stand-alone component or such an assembly of components, respectively, which is made and designed for the respective wiring concept. In interaction with the defined front terminals and end terminals, this interconnection element has the effect that regarding the wiring concept completely different motors can be provided while essential other components of the motor as well as means of production thereof do not need to be modified.

While a myriad of interconnection elements are contemplated and within the spirit of the disclosed embodiments, disclosed interconnection elements include a circuit board, a multilayer circuit board and ring assembly. Interconnection elements may be modular in nature and may comport to the predefined or existing front and end terminals of coil groups.

The disclosed embodiments are further explained in the attached drawings.

These and other aspects of the disclosed embodiments will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Figure 1:
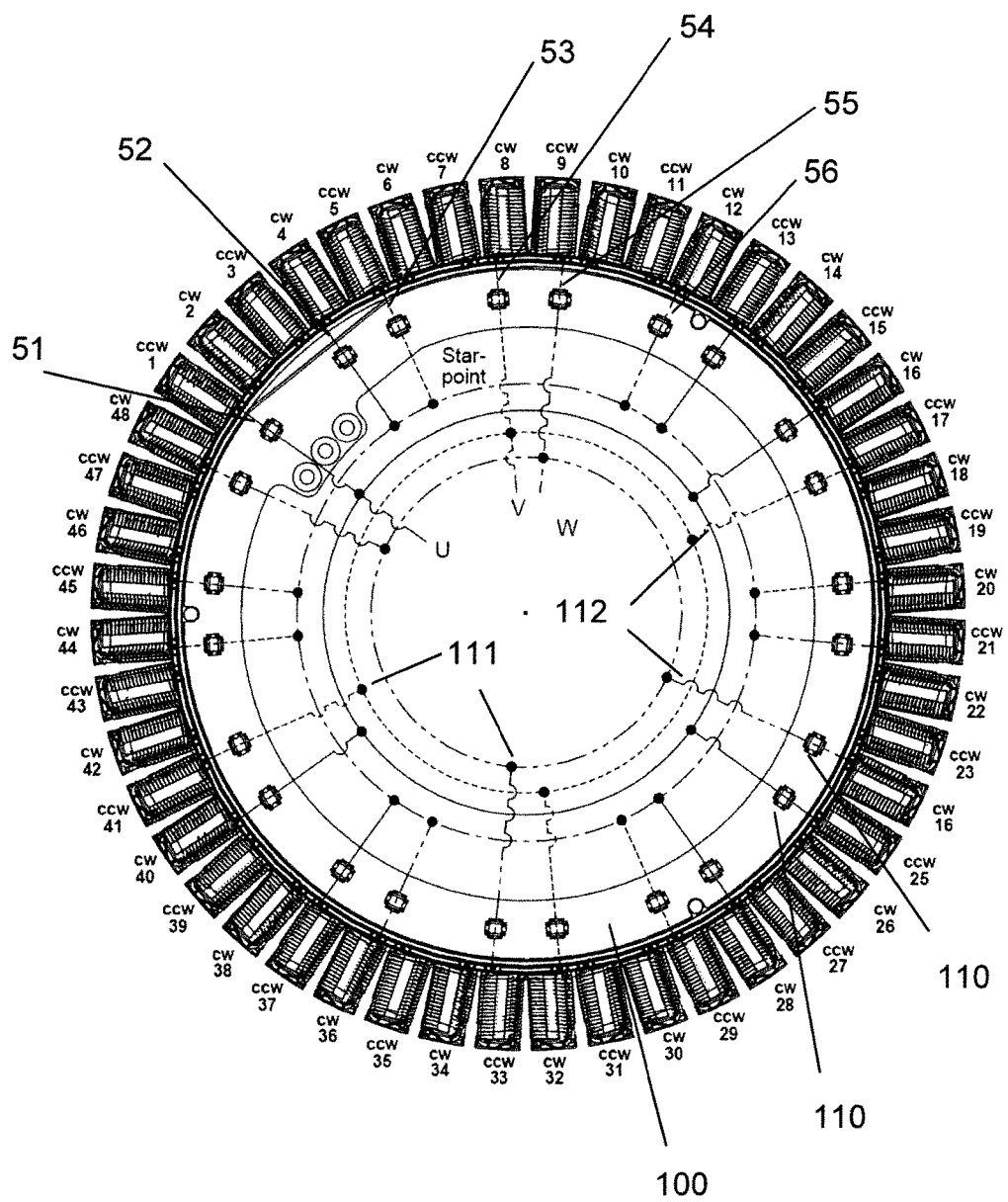
FIG. 1 shows an embodiment of the invention having a coil arrangement with twelve coil groups, each of them comprising four coils, and an interconnection element for realizing a star connection having four parallel coil groups (type 1)
Figure 16:
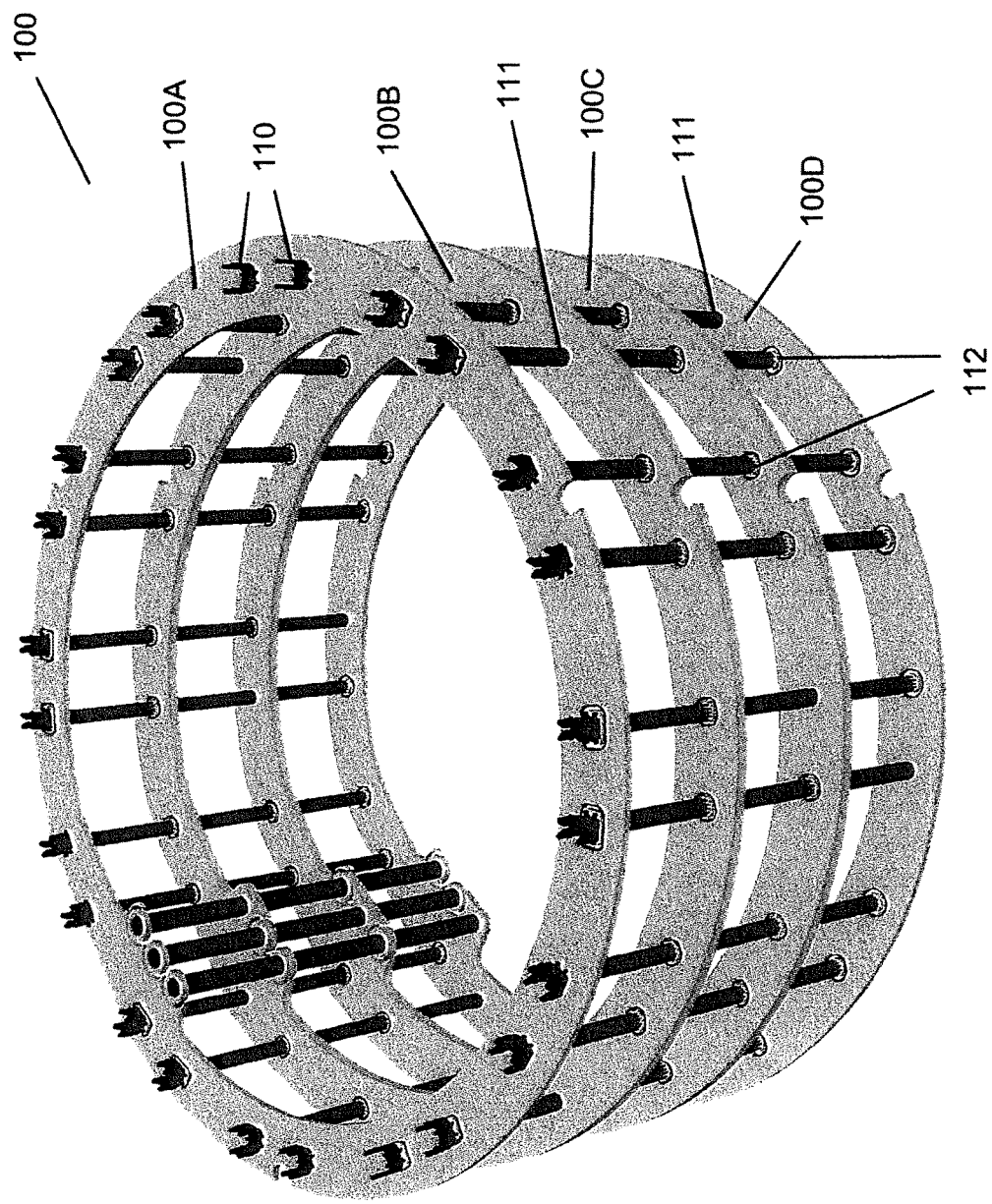
FIG. 16 shows, in an exploded view, a schematic sketch of an interconnection element in which separate layers, terminals and through-contacts are illustrated.
Figure 17:
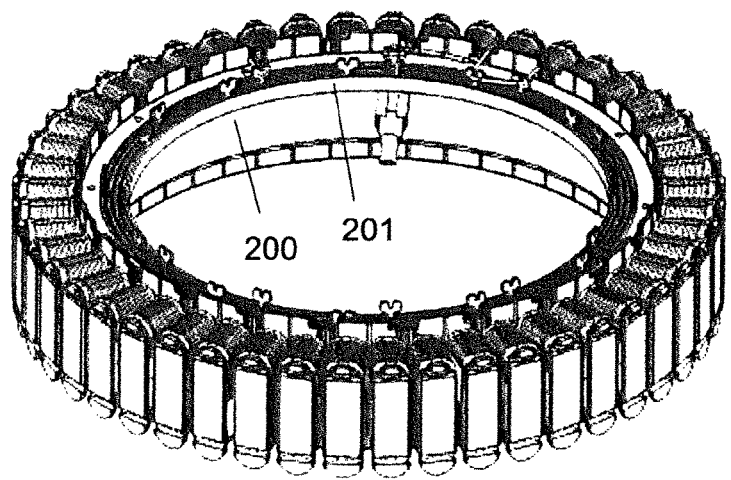
FIG. 17 shows, in a perspective view, a further embodiment of the invention having an interconnection element which has ring terminals.

Disclosed interconnection elements include a circuit board assembly 100, as depicted in FIG. 1 and elsewhere, a multilayer circuit board as found in FIG. 16 and a ring assembly 200 as depicted in FIG. 17 and elsewhere.

The disclosed embodiments relate to a direct current machine where four coils may be combined in one coil group and where the total number of coils may be forty-eight. The described embodiments therefore may have twelve coil groups. However, it is clear for a person skilled in the art that the disclosed embodiments are not limited to this particular combination and that there is a large plurality of other combinations available for the person skilled in the art and contemplated herein.

The interconnections explained in the following as exemplary embodiments comprise six types, namely a star connection having four parallel coil groups (type 1), a delta connection having four parallel coil groups (type 2), star connection having four coil groups in serial sequence (type 3), a delta connection having four coil groups in serial sequence (type 4), a star connection having two sets of two coil groups in serial sequence which sets are connected in parallel (type 5), and a delta connection having two sets of two coil groups in serial sequence which sets are connected in parallel (type 6).

In the following, first preferred embodiments of a direct current motor according to the present invention are explained.

FIG. 1 depicts an assembly of a total of forty-eight coils wherein twelve coil groups having four coils each are formed. The coils are provided with reference numbers or reference signs 1 to 48. The first coil group consists of coils 1 to 4, the second coil group consists of coils 5 to 8 and so on. Furthermore, the winding direction of each coil is indicated, wherein cw stands for clockwise, indicating a winding in clockwise direction, and ccw stands for counterclockwise, indicating a winding in counterclockwise direction.

Figure 13:
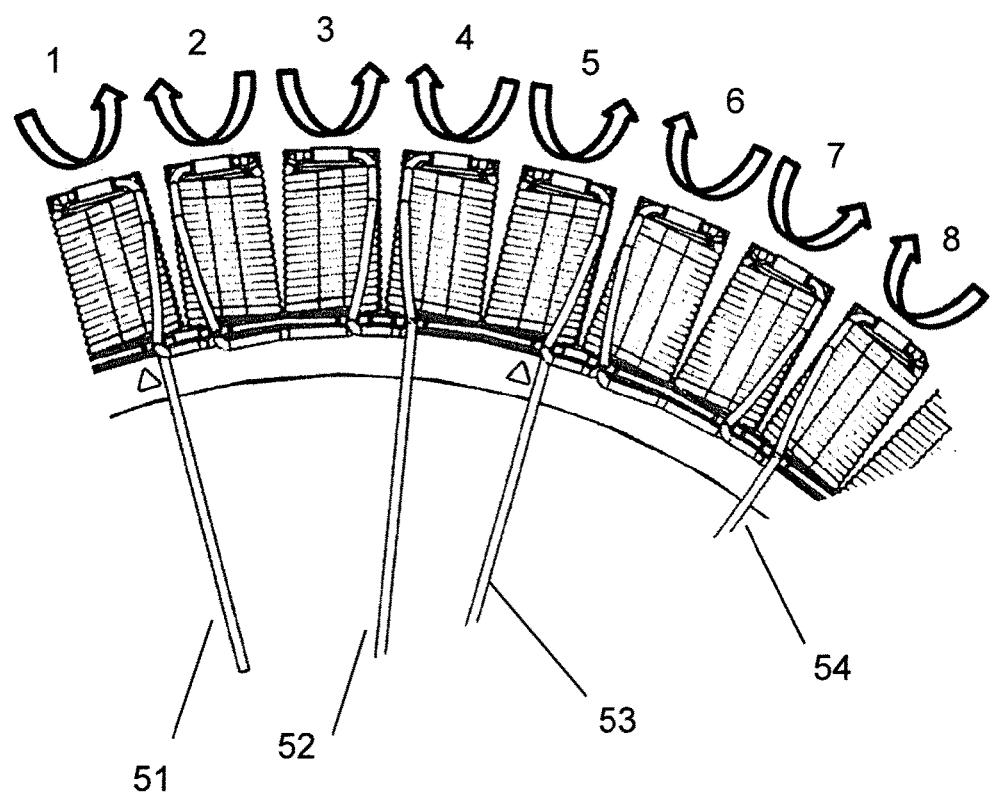
FIG. 13 shows an enlarged partial view of two adjacent coil groups of the embodiments according to FIGS. 1 to 12.
Figure 14:
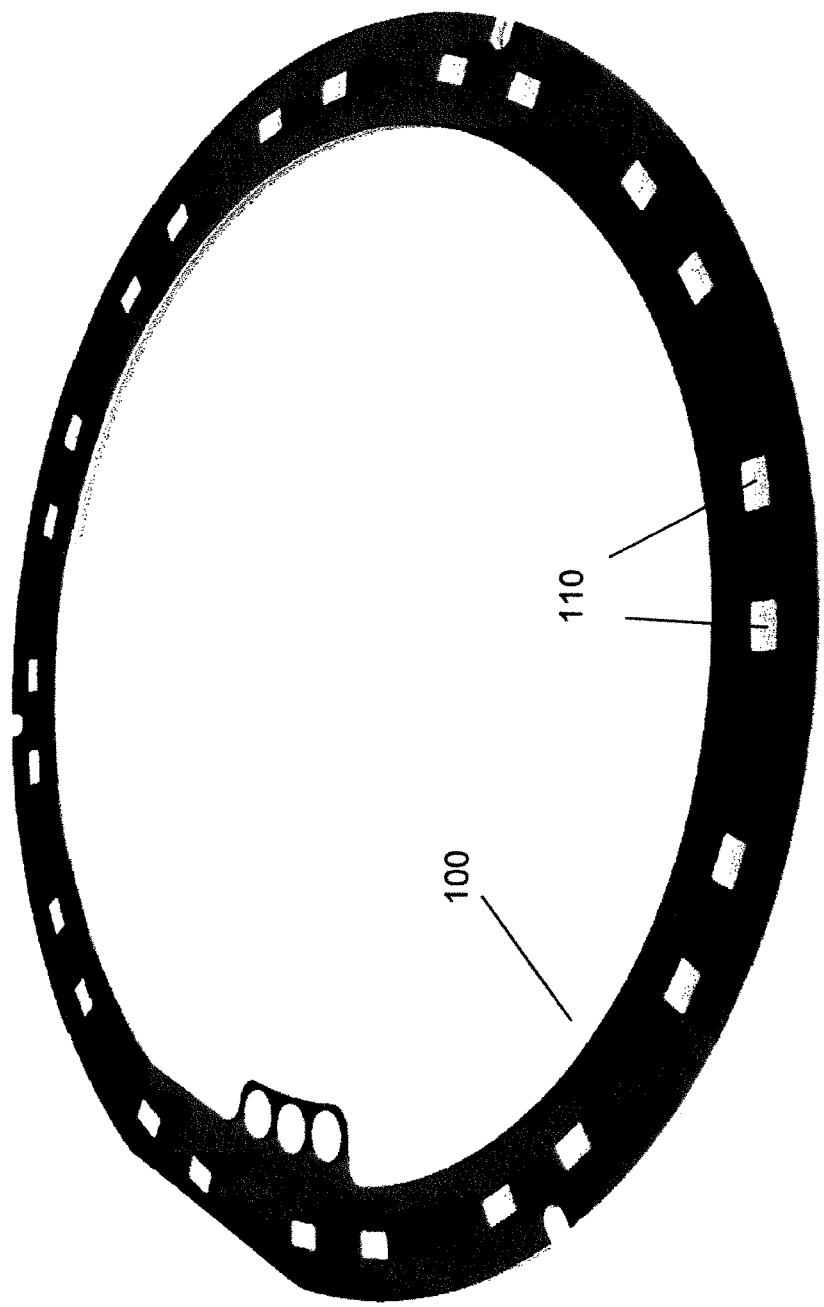
FIG. 14 shows an interconnection element in the form of a circuit board.

FIG. 13 shows as an enlarged partial view two adjacent coil groups having four coils each, namely the first coil group consisting of coils 1, 2, 3 and 4, the second coil group consisting of coils 5, 6, 7 and 8. First, second and third in this connection means second in a direction of circumference. Due to the enlargement, the winding direction can be seen even clearer than in FIG. 1 and is additionally indicated in FIG. 13 by arrows. Both FIG. 1 and FIG. 13 illustrate that always the first and third coil of a coil group are wound in a counterclockwise direction and always the second and forth coil of a coil group are wound in a clockwise direction, so that the winding direction always changes from coil to coil; however, the coil groups are identical to each other with respect to coil arrangement and winding direction.

Terminals, i.e. contact points, namely front terminals and end terminals of the first coil group and the second coil group, respectively, are marked with reference signs 51, 52, 53 and 54, respectively, in FIG. 1 and FIG. 13. Moreover, in FIG. 1 also the front terminal and the end terminal of the third coil group are provided with reference signs 55 and 56, respectively.

FIG. 1 also shows an embodiment of an interconnection element in the form of a circuit board assembly 100 and terminals 110 for receiving the front terminals and end terminals including terminals 51, 52, 53, 54, 55 and 56. The terminals 51 and 52 of the first coil group having coils 1 to 4 are depicted with solid lines. They correspond to phase U. The terminals 53 and 54 of the second coil group having coils 5 to 8 are depicted with dotted lines. They correspond to phase V. The terminals 55 and 56 of the third coil group having coils 9 to 12 are depicted with chain dotted lines. They correspond to phase W. The same applies to the further coil groups of this embodiment which follow in the direction of circumference in the same order and sequence.

Figure 2:
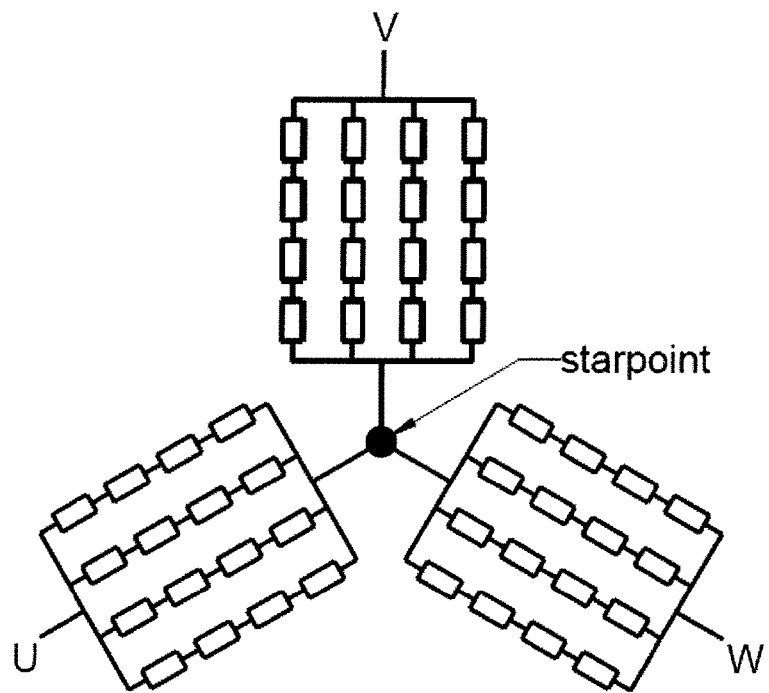
FIG. 2 shows a schematic sketch of a star connection having four parallel coil groups (type 1)

Furthermore, corresponding concentric circles having solid, dotted and chain dotted lines, respectively, as well as contact points 111 and non-contact points 112 as well as the starpoint, the function and meaning of which is understood in this technical field, clearly indicate the interconnection for the wiring concept for realizing a star connection having four parallel coil groups (type 1), which is schematically illustrated in FIG. 2.

Figure 3:
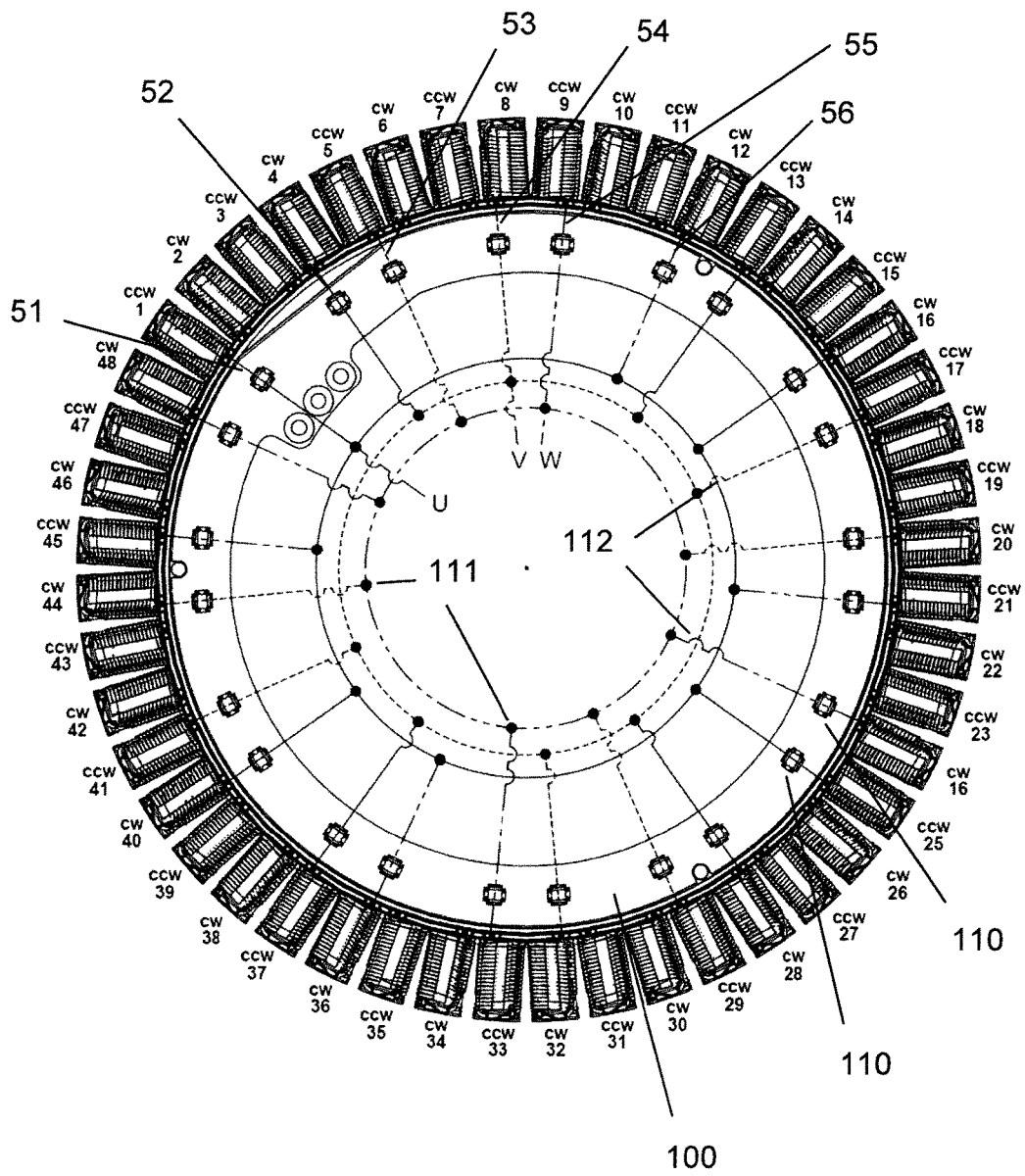
FIG. 3 shows an embodiment of the invention having a coil arrangement with twelve coil groups, each of them comprising four coils, and an interconnection element for realizing a delta connection having four parallel coil groups (type 2)
Figure 4:
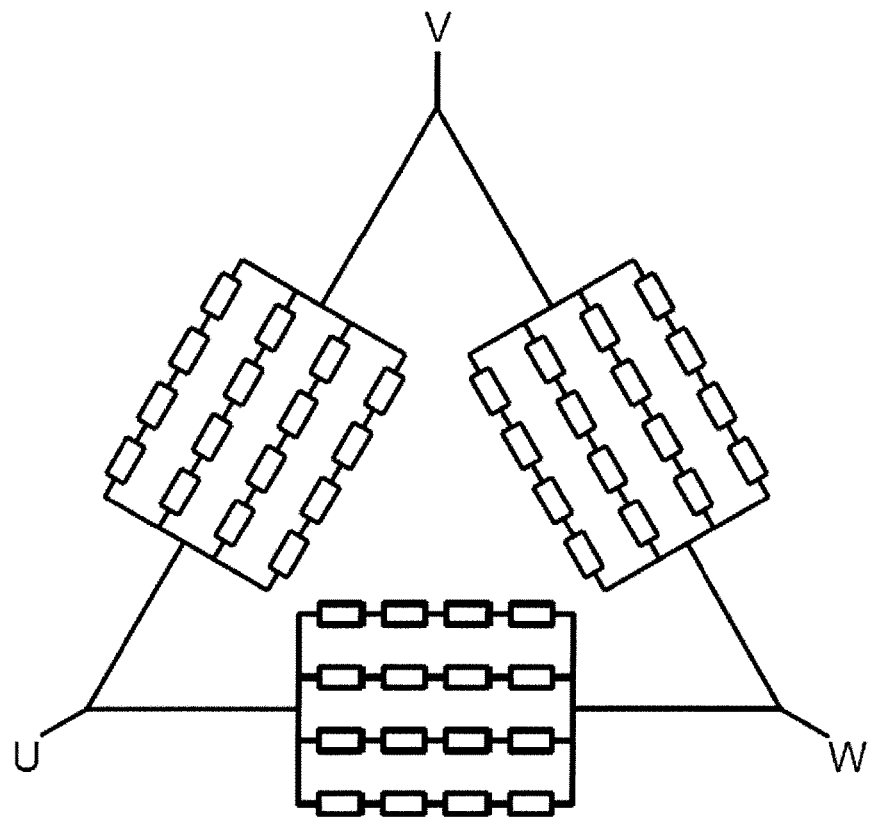
FIG. 4 shows a schematic sketch of a delta connection having four parallel coil groups (type 2)
Figure 5:
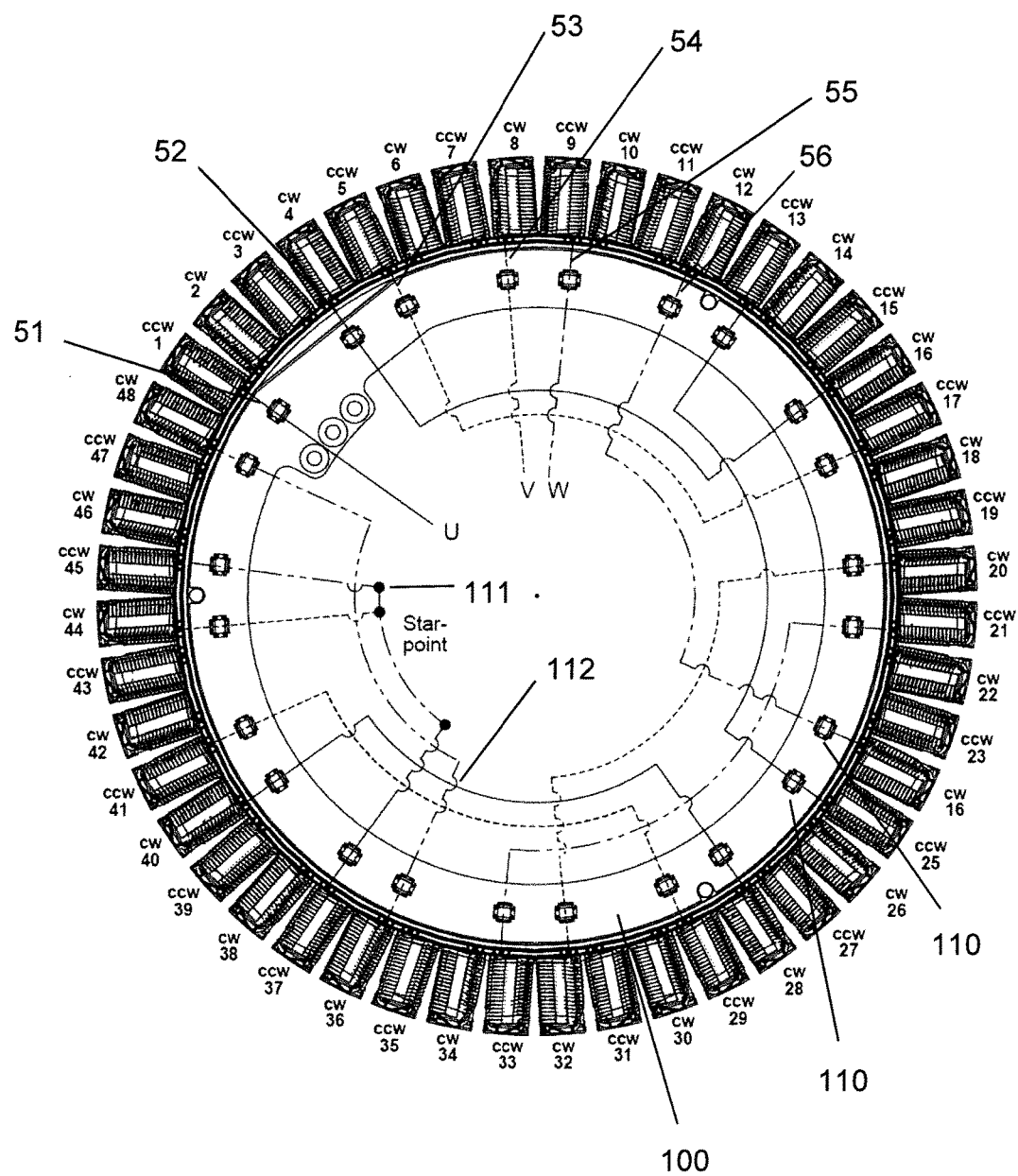
FIG. 5 shows an embodiment of the invention having a coil arrangement with twelve coil groups, each of them comprising four coils, and an interconnection element for realizing a star connection having four coil groups in serial sequence (type 3)
Figure 6:
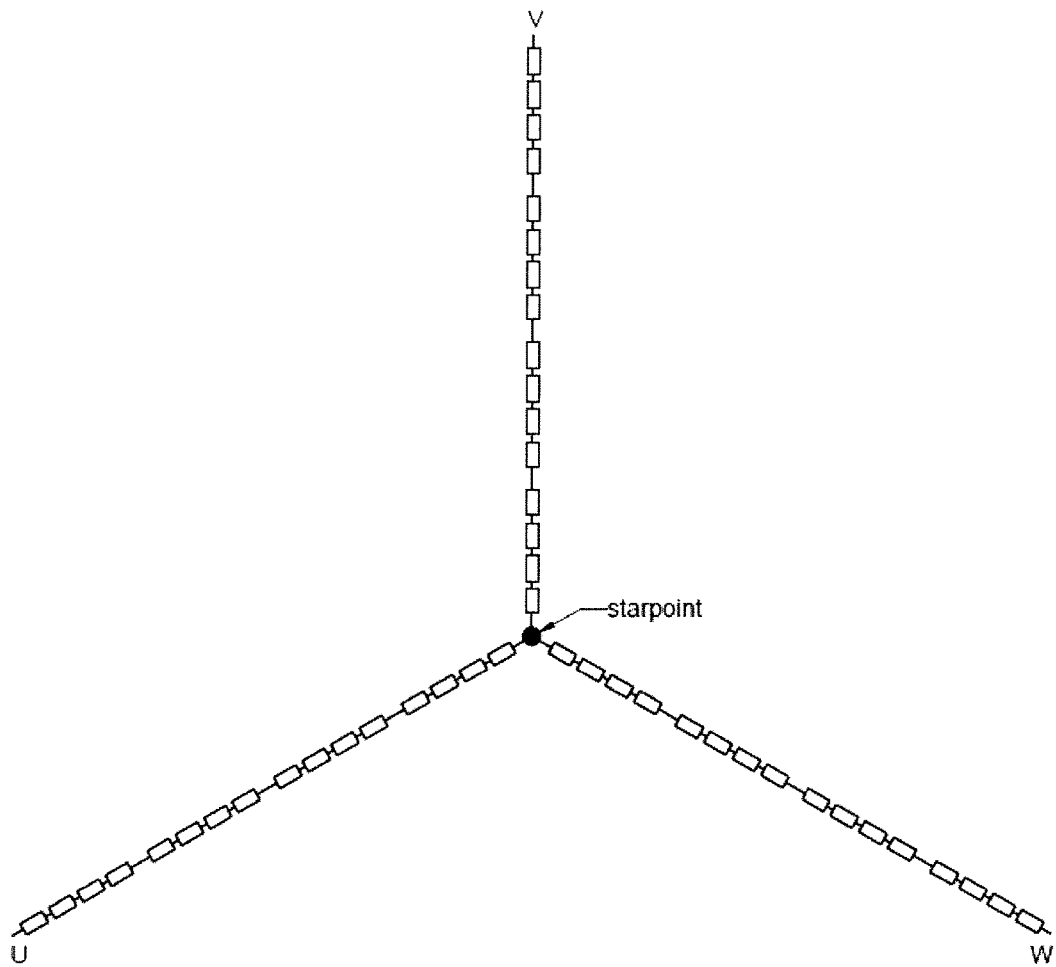
FIG. 6 shows a schematic sketch of a star connection having four coil groups in serial sequence (type 3)
Figure 7:
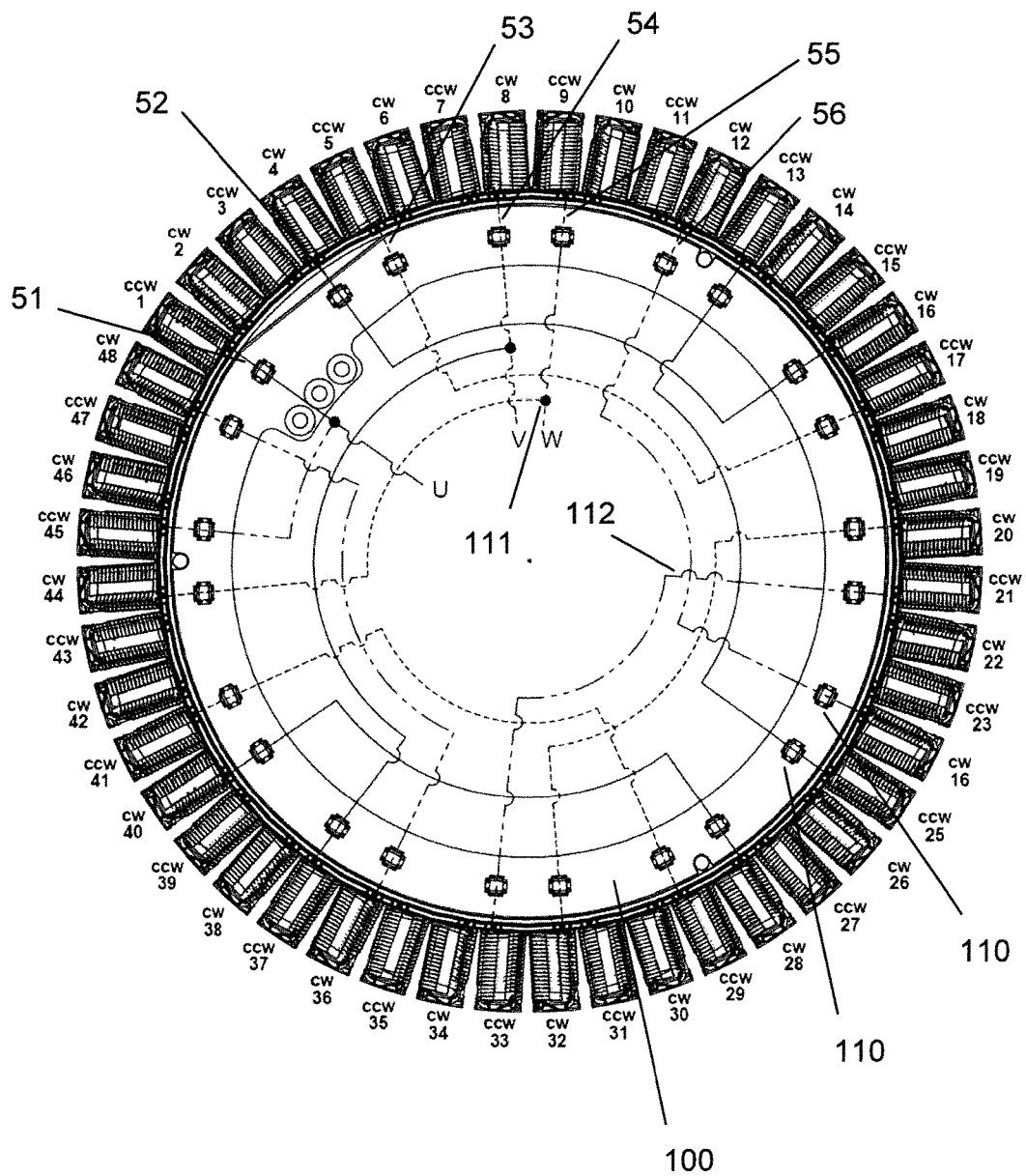
FIG. 7 shows an embodiment of the invention having a coil arrangement with twelve coil groups, each of them comprising four coils, and an interconnection element for realizing a delta connection having four coil groups in serial sequence (type 4)
Figure 8:
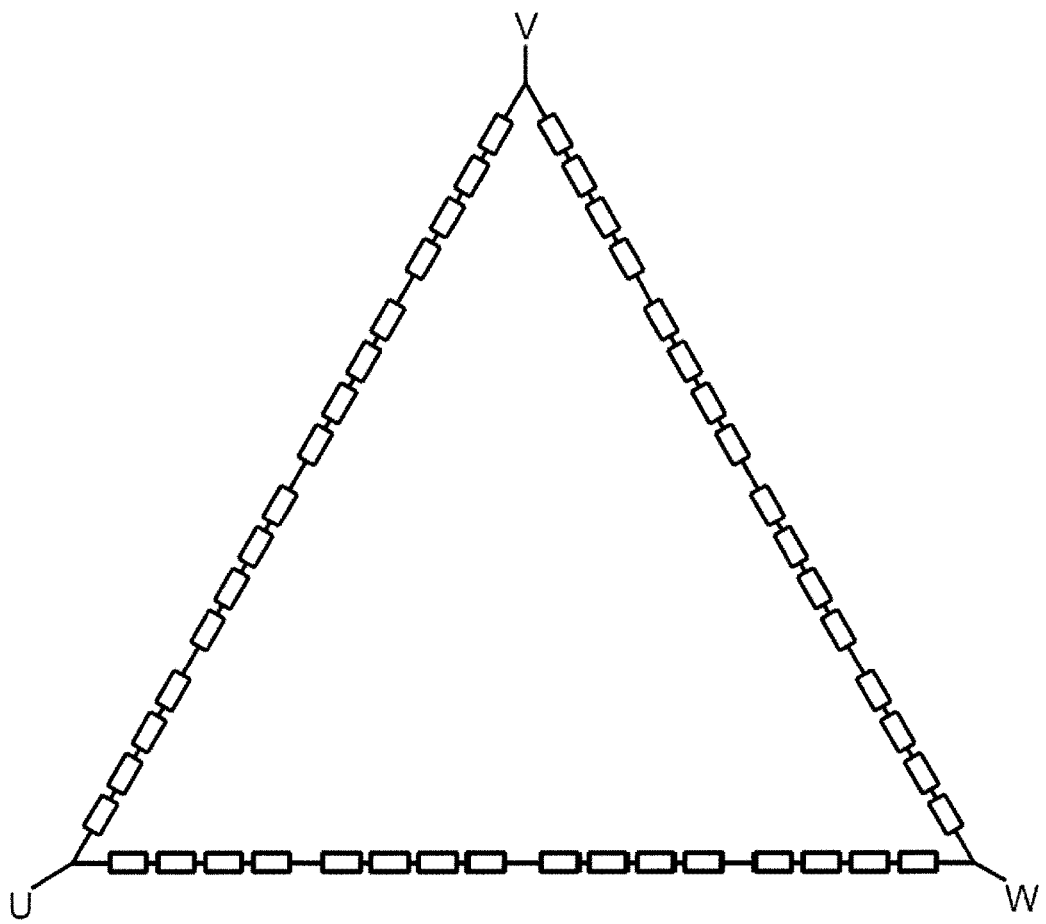
FIG. 8 shows a schematic sketch of a delta connection having four coil groups in serial sequence (type 4)
Figure 9:
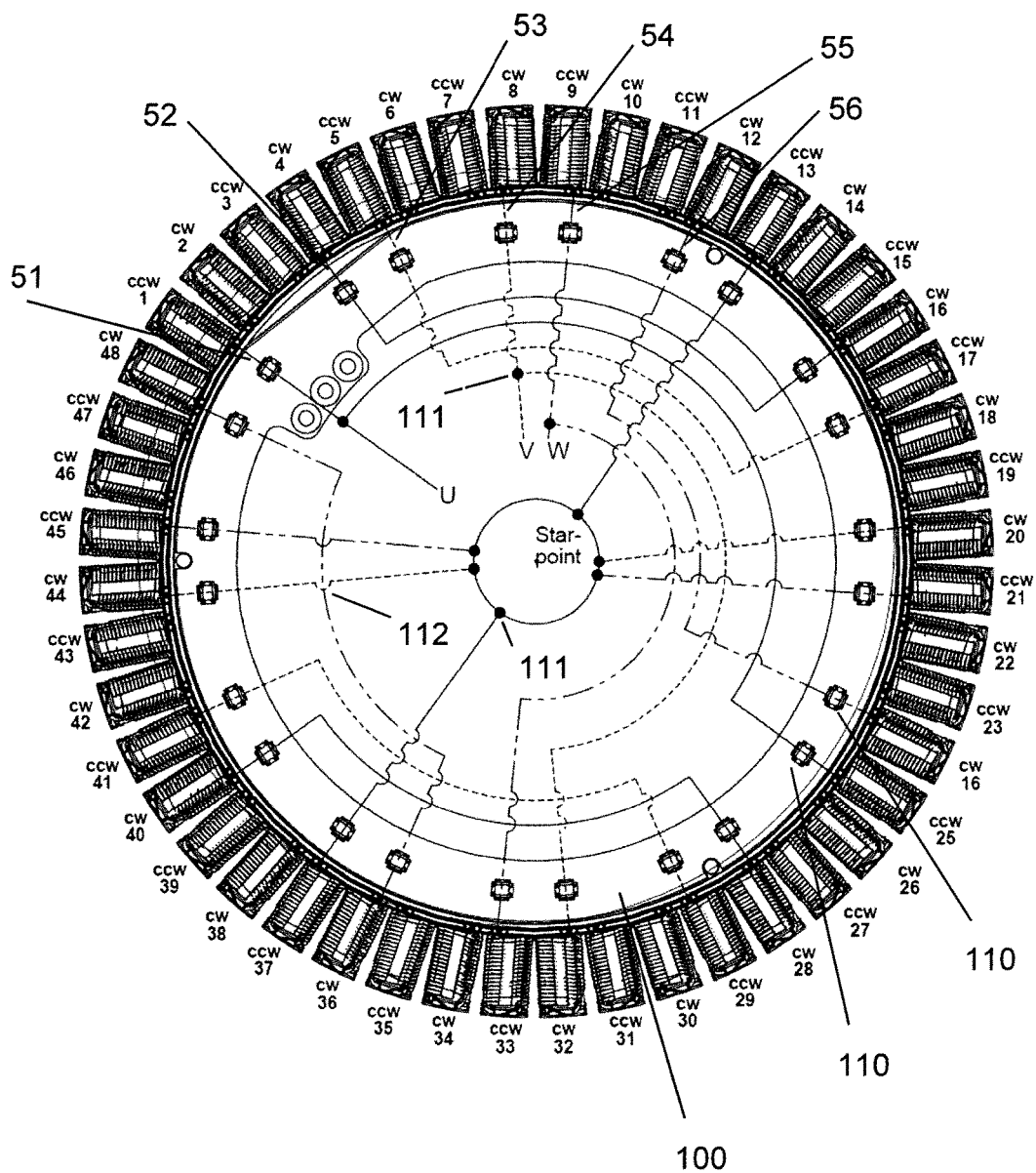
FIG. 9 shows an embodiment of the invention having a coil arrangement with twelve coil groups, each of them comprising four coils, and an interconnection element for realizing a star connection having two sets of two coil groups in serial sequence which sets are connected in parallel (type 5)
Figure 10:
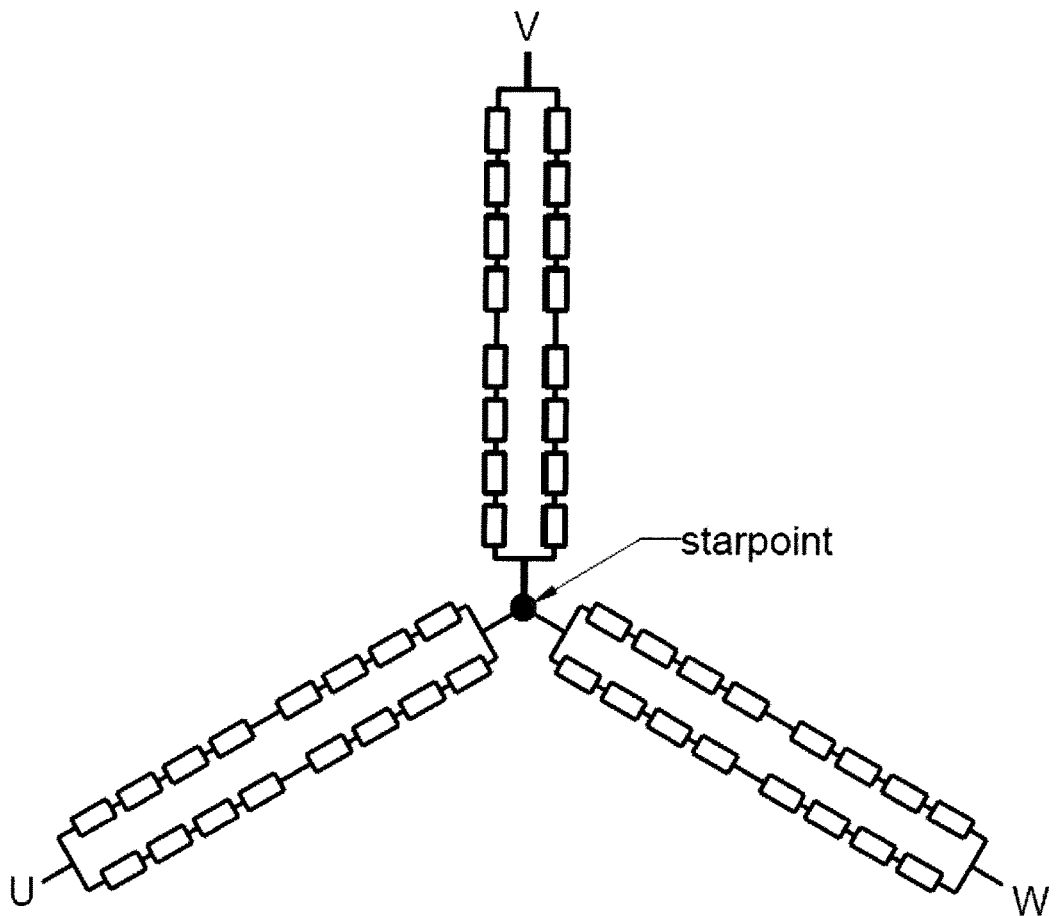
FIG. 10 shows a schematic sketch of a star connection having two sets of two coil groups in serial sequence which sets are connected in parallel (type 5)
Figure 11:
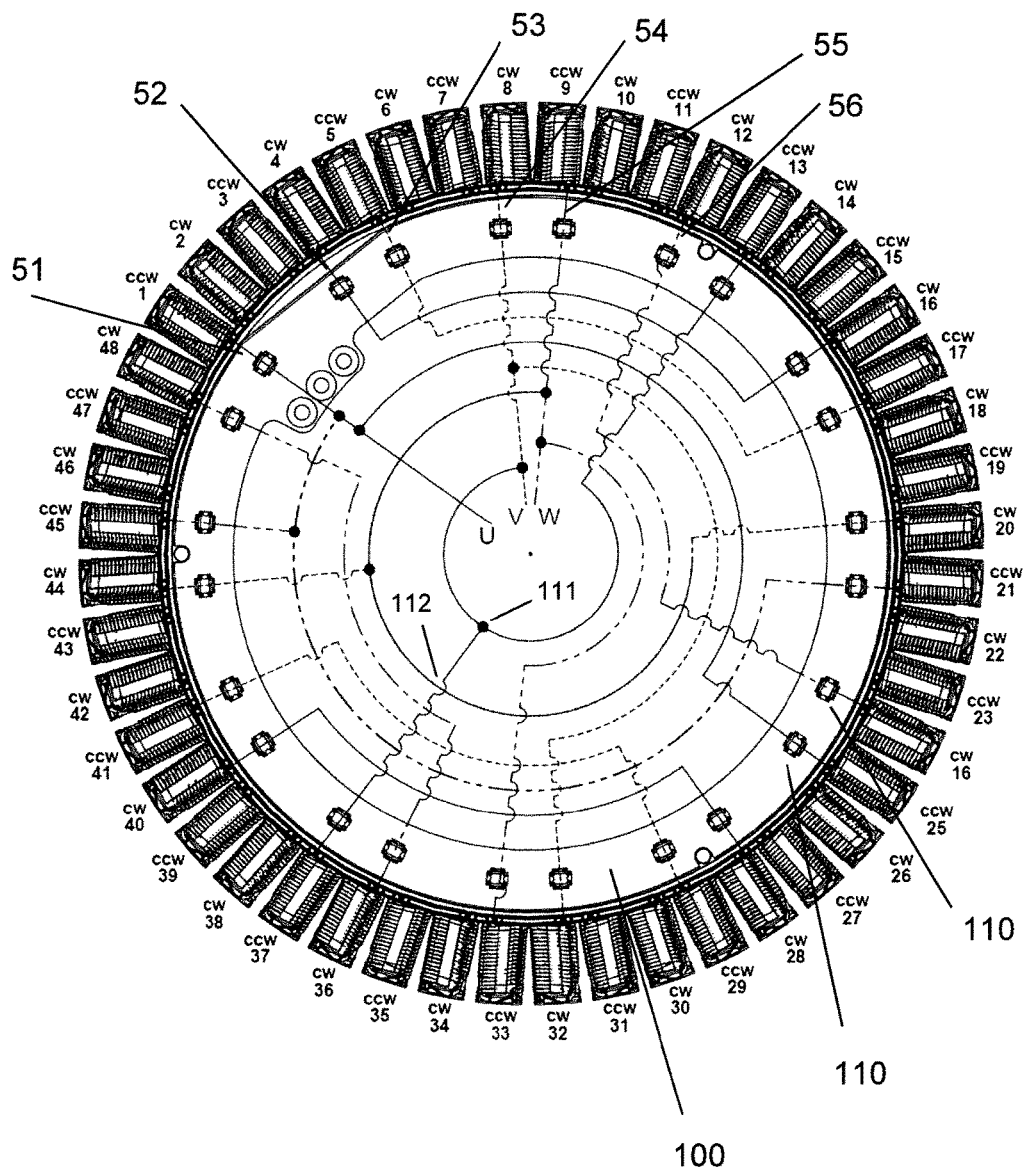
FIG. 11 shows an embodiment of the invention having a coil arrangement with twelve coil groups, each of them comprising four coils, and an interconnection element for realizing a delta connection having two sets of two coil groups in serial sequence which sets are connected in parallel (type 6)
Figure 12:
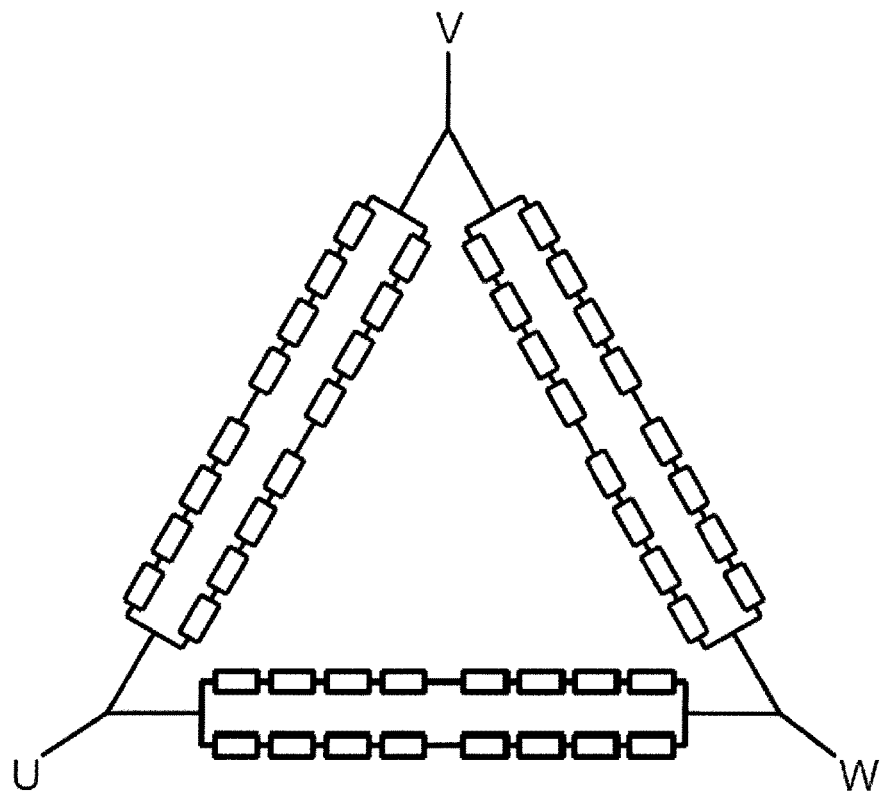
FIG. 12 shows a schematic sketch of a delta connection having two sets of two coil groups in serial sequence which sets are connected in parallel (type 6)

In a corresponding manner, FIG. 3 shows an embodiment of the invention having a coil arrangement with twelve coil groups, each of which having four coils, and an interconnection element for realizing a delta connection having four parallel coil groups (type 2), FIG. 5 shows an embodiment of the invention having a coil arrangement with twelve coil groups, each of which having four coils, and an interconnection element for realizing a star connection having four coil groups in serial sequence (type 3), FIG. 7 shows an embodiment of the invention having a coil arrangement with twelve coil groups, each of which having four coils, and an interconnection element for realizing a delta connection having four coil groups in serial sequence (type 4), FIG. 9 shows an embodiment of the invention having a coil arrangement with twelve coil groups, each of which having four coils, and an interconnection element for realizing a star connection having two sets of two coil groups in serial sequence which sets are connected in parallel (type 5), and FIG. 11 shows an embodiment of the invention having a coil arrangement with twelve coil groups, each of which having four coils, and an interconnection element for realizing a delta connection having two sets of two coil groups in serial sequence which sets are connected in parallel (type 6).

The corresponding wiring concepts for the types 2 to 6 are schematically show in FIGS. 4, 6, 8, 10 and 12, respectively.

Figure 15:
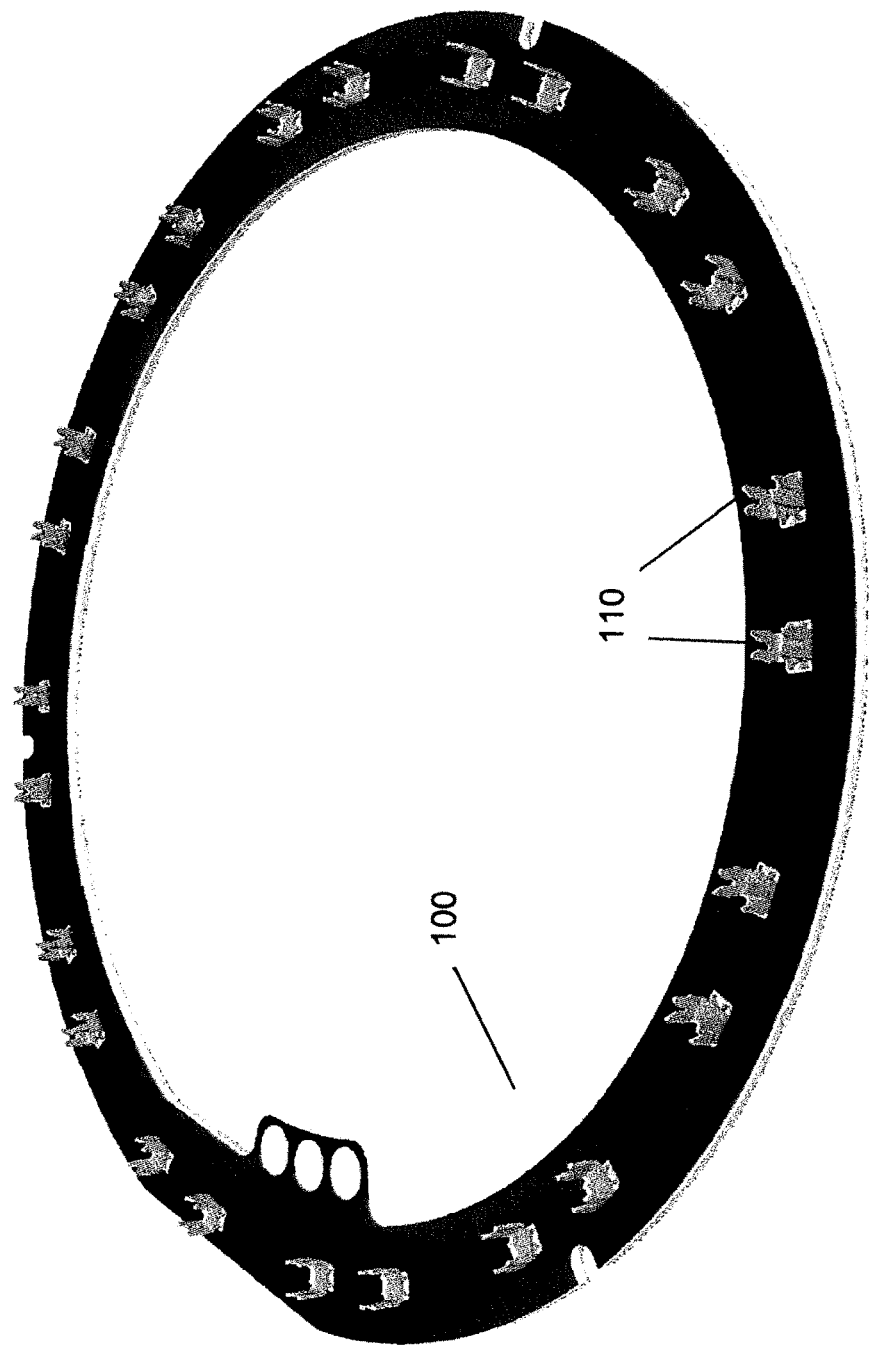
FIG. 15 shows an interconnection element in the form of a circuit board having contact elements (cutting-clamping contacts) attached to it.

FIG. 16 shows, in an enlarged, schematic and exploded view, a circuit board assembly 100 having multiple layers, also called multi-layer circuit board assembly, having a first outer layer 100A, a first inner layer 100B, a second inner layer 100C and a second outer layer 100D as well as terminals 110 and contact points 111 and non-contact points 112. FIG. 15 shows the circuit board assembly in a state when put together (assembled).

In the depiction of FIG. 16, in each case where a terminal 110, for instance designed as a cutting-clamping contact, or a through-contact (here depicted as a column) starting out from such terminal, is surrounded by a white ring or a white square with respect to one of the rings, namely the cover plate or first outer layer 100A, the first inner layer 100B, the second inner layer 100C and the second outer layer 100D, this means that in this respect an insulation is provided. Where there is no such white ring or white square, an electric contact is provided.

The structure of a so-called multi-layer circuit board can for instance be obtained by a process which is known to a person skilled in the art, namely by laminating single layers of copper plated circuit boards by so-called prepregs (pre-impregnated semi-products) on each other. Prior to the step of lamination, copper coatings are partially removed via photolithographic processes so that a circuit board pattern is formed. This sandwich structure formed from several layers is then provided with holes at predetermined through-contact points which subsequently are coppered in a chemical and then galvanic process. These through-contacts, so-called vias, are connected to the adjacent copper of the respective layers. At those spots where the copper had been removed by etching, there is no electric contact.

Then, terminals can be mounted on this multi-layer circuit board. In the embodiment shown here, the terminals are attached to respective solder contact points provided therefore by an SMD (surface mounted device) soldering process.

With an otherwise identical direct current machine, merely by using a different interconnection element, for instance in the form of the above-described circuit board assembly 100 or with those mentioned below or further interconnection elements having the same function, it is therefore possible to realize a direct current machine having different characteristics, for instance according to the above-described types 1 to 6, although all basic dimensions and the coils and the windings, are exactly identical. Accordingly, this provides for a great variability with a low need of investment.

Concerning the dimension of the variability, reference is made to the table below which shows respective theoretical characteristics for the types 1 to 6 discussed in connection with the embodiments described above.

Theoretical Relations in Case of Identical Line-to-Line Current and Line-to-Line Voltage

| Type | Line | Interconnection | Speed [1/s] | Torque [Nm] |
|---|---|---|---|---|
| 1 | 4 parallel | star | 4 | 0.25 |
| 2 | 4 parallel | delta | 6.928 | 0.144 |
| 3 | 4 serial | star | 1 | 1 |
| 4 | 4 serial | delta | 1.73 | 0.577 |

-continued

| Type | Line | Interconnection | Speed [1/s] | Torque [Nm] |
|---|---|---|---|---|
| 5 | 2 parallel, 2 serial | star | 2 | 0.5 |
| 6 | 2 parallel, 2 serial | delta | 3.464 | 0.289 |

With the circuit board assembly 100 as described above, the winding process including the contact of the first outer layer 100A which includes the terminals or contact points and contact positions, respectively, can be the same for all motor types. The differences concerning interconnection are realized by different versions of the circuit board assembly 100 which generates and brings about different interconnections of the respective pick-up points or contact points, respectively.

It is understood for a person skilled in the art that instead of the circuit board assembly 100 described above also other interconnection elements can be taken into consideration, particularly circuit board assemblies which are provided with a plurality of interconnection configurations which can be controlled by switch elements mounted on the circuit board. Hence, a machine equipped with such a circuit board can for instance be operated in a first operation point with a high torque and a low speed and in a second operation point with a low torque and high speed. Accordingly, an electronic circuit can be realized which makes it possible to obtain machine characteristics which are adapted to the operational conditions. The advantage is that for operation of the machine over its entire range of operation, the power source (current and voltage) as well as the corresponding power electronics can be of lower dimensions. Such circuit board assembly which realizes several interconnection patterns which can be switched during operation of the direct current machine can be provided as a separate and independent interconnection element in the meaning of the present invention, too.

The front terminals and end terminals (contact points) 51, 52, 53, 54, 55 and 56 can be designed as pick-up contact positions which get into electrically conductive contact with respective contact points (terminals) of the interconnection element when said interconnection element is inserted into the coil assembly.

According to one embodiment, flat ring terminals 210 bent and formed from a metallic material can be provided for interconnection which ring terminals 210 can be arranged in a desired manner, concentric or stacked, in a carrier element 201 which completes the interconnection element 200.

Figure 18:
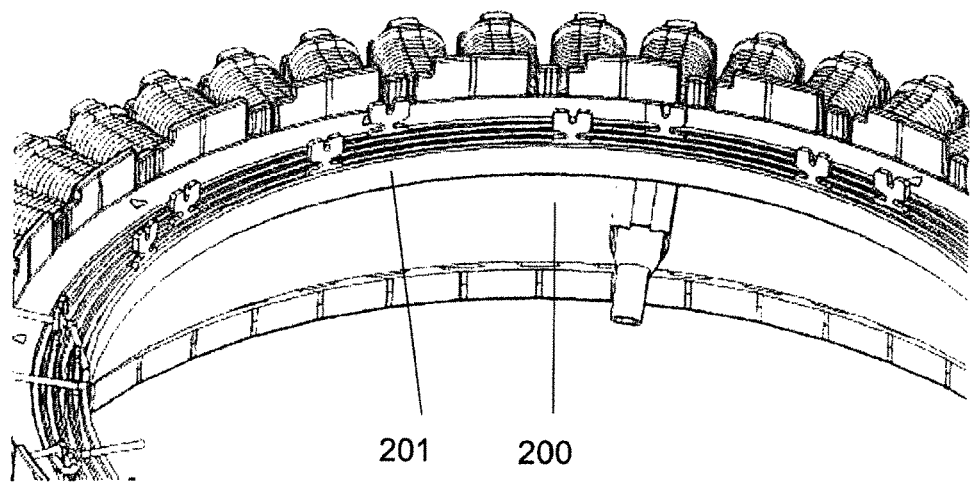
FIG. 18 shows an enlarged partial view of the embodiment according to FIG. 17.
Figure 19:
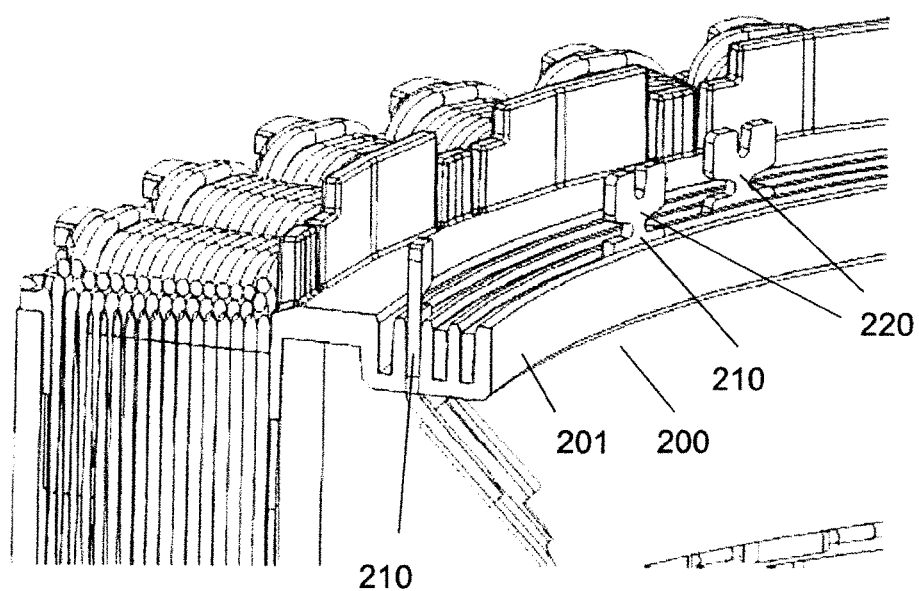
FIG. 19 shows a still further enlarged partial view of the embodiment according to FIG. 17.
Figure 20:
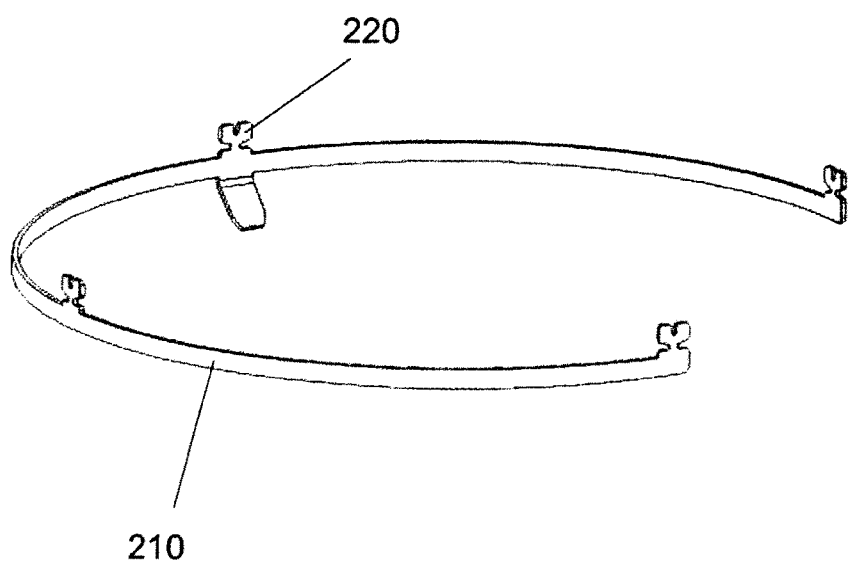
FIG. 20 shows a ring terminal of the embodiment according to FIGS. 17 to 19.

FIG. 17 shows in a perspective depiction a further embodiment of the invention having an interconnection element 200 which has ring terminals 210 which are provided with terminals 220 for receiving front terminals and end terminals (contact points) 51, 52, 53, 54, 55 and 56. FIGS. 18 and 19 show enlarged partial views of the interconnection element 200 and FIG. 20 shows a single ring terminal 210.

The terminals 220 of the ring terminals 210 are connected with the front terminals and end terminals (contact points) 51, 52, 53, 54, 55 and 56 in the same manner as explained in connection with the above-described embodiment where the interconnection element 100 is designed as a circuit board. In so far, the terminals 220 of the ring terminals 210 correspond to the terminals 110 of the circuit board assembly 100. In both cases, the wire endings shown for instance in FIG. 13 are connected, for instance inserted in, the terminals 220 of the ring terminals 210 or the terminals 110 of the circuit board assembly 100, respectively.

The circuitry of a circuit board or circuit board assembly is well understood by a person skilled in the art. The ring terminals 210 realize the same circuitry in so far as the rings correspond to the strip conductors or tracks of a printed circuit board.

In one embodiment, four concentric ring terminals 210 are provided, one for each phase U, V and W (see FIG. 19) and one for the starpoint (not shown in FIG. 19 where only the respective groove in the carrier element 201 is depicted).

The invention is not limited to the embodiments shown in the drawings. Rather, it is evident for a person skilled in the art that the invention as defined in the attached claims comprises numerous further embodiment of which some are mentioned as examples in the following.

In FIGS. 1, 3, 5, 7, 9 and 11, the coils are directed in a star-like manner to the outside and are surrounded (enclosed) in a direct current machine ready for operation by a ring (not shown here) having a plurality of magnets which are alternatively magnetized north and south. Both components, the one comprising the magnets and the one comprising the coils, can be the stator or the rotor, respectively. It is also understood that the coils also can be directed to the center and can surround (encircle) a component having a plurality of magnets which are alternatively magnetized north and south. Also in such case, both the inner component and the outer component can be designed as the rotor or the stator, respectively.

In the following, an embodiment of a method for manufacturing a direct current machine according to the present invention is explained in addition to what is already evident from the above description of an embodiment of a direct current machine according to the present invention.

In a manner which is known in the art, the cores of the coils are packed from single metal sheets to form a so-called metal sheet stack. These metal sheet stacks are then provided with an insulation, for instance in an injection molding process. Then, insulated copper wire can be wound around the respective teeth (coil cores) of the metal sheet stack which are covered by the insulation layer. Depending on the particular application, it is also possible to first assemble single teeth or coil groups, then provide the insulation layer around them, then wind insulated wire around them and then assemble the teeth or coil groups. In one embodiment, the before-mentioned steps can be a "provision of a ready to be wound coil core assembly".

Concerning the coil groups, front terminals and end terminals (contact points) are formed. In one embodiment, the before-mentioned steps can be a "provision of pick-up front terminals and end terminals (contact points)".

An interconnection element is designed and made such that it can be brought into electrically conductive contact with the front terminals and the end terminals (contact points) of the coil groups so that a specific wiring concept is realized. A wiring concept in the meaning of one aspect of the present invention is for instance an interconnection of the coil groups according to the types 1 to 6 as described above. In one embodiment, the before-mentioned step can be a "provision an interconnection element for realizing a specific wiring concept".

The insertion of the interconnection element into the coil core assembly can be done prior to or after insulated copper wire is wound around the coil cores of the ready to be wound coil core assembly. The interconnection element can brought into electrically conductive contact with the front terminals and end terminals (contact points) of the coil groups and secured in this operational position. Depending on the particular embodiment and design of the interconnection element, this can be done during or after the winding operation.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A direct current machine, the machine comprising: a stator and a rotor, wherein one of these two has a plurality of magnets which are alternatively magnetized north and south, and the respective other part has a plurality of coils which are formed by teeth around which insulated wire is wound, wherein between these coils there are formed respective slots and the coils are combined in coil groups: a current controlled inverter for driving the machine; wherein each coil group has a front terminal and a rear terminal and the coil groups are connected such that a defined wiring concept is formed; wherein the front terminals and end terminals are connected via an interconnection element which is specifically designed for a defined wiring concept; and wherein the interconnection element is provided in the form of a circuit board assembly.

2. The machine of claim 1 wherein after each last coil of a coil group, seen in a direction of circumference, an end contact point in the form of a coil group end terminal is provided and in front of the first coil of a next coil group, seen in the direction of circumference, a start contact point in the form of a coil group start terminal is provided.

3. The machine of claim 1 wherein the interconnection element has contact points for coil group end terminals and coil group start terminals.

4. The machine of claim 1 wherein the circuit board assembly comprises a first outer layer, two inner layers and a second outer layer.

5. The machine of claim 1 wherein the circuit board comprises a plurality of interconnection configurations which can be controlled via switch elements for realizing different wiring concepts, wherein the switch elements are preferably mounted on the circuit board.

6. The machine of claim 1, wherein the interconnection element comprises ring terminals bent and formed from a flat metallic material.

* * * * *